United States Patent [19]
Altes et al.

[11] Patent Number: 5,733,960
[45] Date of Patent: Mar. 31, 1998

[54] ENHANCED LONGEVITY OF SURFACE DRYING OIL ON A SEALANT MODIFIED BY INCORPORATION OF ZINC OXIDE

[75] Inventors: Michael Gene Altes; Virginia Kay O'Neil; Arthur James Tselepis; Andreas Thomas Franz Wolf, all of Midland, Mich.

[73] Assignee: Dow Corning Corporation, Midland, Mich.

[21] Appl. No.: 628,170

[22] Filed: Apr. 4, 1996

[51] Int. Cl.$^6$ .............................. C08K 3/18; C08K 3/22; C08G 77/06
[52] U.S. Cl. .................. 524/432; 524/263; 524/313; 524/393; 524/588; 528/17
[58] Field of Search ....................... 524/263, 313, 524/393, 432, 588; 528/17

[56] References Cited

U.S. PATENT DOCUMENTS

| | | | |
|---|---|---|---|
| 4,460,740 | 7/1984 | Arai | 524/724 |
| 4,695,603 | 9/1987 | Inoue et al. | 524/723 |
| 5,264,603 | 11/1993 | Altes et al. | 524/448 |
| 5,357,025 | 10/1994 | Altes et al. | 528/42 |

FOREIGN PATENT DOCUMENTS

| | | |
|---|---|---|
| 76452 | 6/1981 | Japan . |
| 76453 | 6/1981 | Japan . |

*Primary Examiner*—Karen A. Dean
*Attorney, Agent, or Firm*—Roger H. Borrousch; Patricia M. Scaduto

[57] ABSTRACT

The longevity of a surface driving oil layer on a room temperature vulcanizable silicone sealant is increased by adding zinc oxide to a non-acidic composition and exposing the composition to atmospheric moisture which forms the surface drying oil layer on an air exposed surface.

24 Claims, No Drawings

ENHANCED LONGEVITY OF SURFACE DRYING OIL ON A SEALANT MODIFIED BY INCORPORATION OF ZINC OXIDE

BACKGROUND OF THE INVENTION

1. Field of the Invention

This invention relates to a method for increasing the longevity of surface drying oil on a room temperature vulcanizable silicone sealant.

2. Background Information

Silicone compositions which cure to produce elastomers at room temperature are widely used as sealants and caulking materials because they have a unique property profile for applications, such as in building construction. These properties include excellent weatherability, resistance to heat, maintaining their flexibility at low temperatures, ease of application, and rapid cure in place. However, the silicone sealants over a period of time often become dirty or stain the surrounding substrates adjacent to them. This creates an unattractive appearance and cleaning the dirt off the sealant and the stain off the adjacent building materials is expensive and often the results are unsatisfactory. It is therefore the hope of the construction industry to have a silicone sealant developed which does not become dirty or stain the adjacent building materials. Many methods have been proposed to eliminate the problems of dirt pick-up and staining encountered with the use of room temperature vulcanizable (hereinafter referred to as RTV) silicone sealants in construction.

Some of the approaches to overcoming the staining problems and the dirt pick-up problems are the use of surfactants described by Arai in U.S. Pat. No. 4,460,740, issued Jul. 17, 1984, by Inoue et al in U.S. Pat. No. 4,695,603, issued Sep. 22, 1987, and in Japanese Kokai (Laid Open) Patent Publication No. 56-76453, and Japanese Kokai Patent Publication No. 56-76452, both assigned to Toshiba Silicone KK, and published on Jun. 24, 1981.

An especially successful approach to eliminating the dirt pick-up and the staining problems is described by Altes et al in U.S. Pat. No. 5,357,025, issued Oct. 18, 1994. Altes et al describe the use of a siloxaphobic agent which contains per molecule at least one perfluorocarbon group of the formula $C_xF_{(2x+1)}$—where x has an average value of at least 6. Using this siloxaphobic agent in combination with a drying oil results in a particularly useful sealant with good resistance to dirt pick-up and little or no staining of adjacent materials. Altes et al is hereby incorporated by reference to show RTV silicone sealant compositions which provide resistance to dirt pick-up and staining, especially those which contain a drying oil. The inventors found that when RTV silicone sealants containing drying oil were used, the surface of the cured silicone sealant which had a drying oil oxidation product layer gradually disappeared and its effectiveness for remaining clean was reduced. It was therefore desirable to find a way to increase the effectiveness of the drying oil oxidation product layer to resist dirt pick-up for longer periods of time.

SUMMARY OF THE INVENTION

It is therefore an object of this invention to provide a method of increasing the longevity of the surface drying oil layer on an RTV sealant.

This invention relates to a method of increasing the longevity of a drying oil layer on an air exposed surface of a cured silicone sealant comprising (A) mixing particulate zinc oxide into a non-acidic room temperature curable silicone sealant composition comprising a drying oil, a polymer with moisture condensable silyl ends, a crosslinking agent, and a filler, where the zinc oxide is added in an amount of at least 2 parts by weight per 100 parts by weight of the polymer, (B) exposing the resulting mixture of (A) to atmospheric moisture producing a cured sealant having a drying oil layer on an air exposed surface where said surface maintains the drying oil layer on it for a longer period of time than if zinc oxide was not added.

DETAILED DESCRIPTION OF THE PREFERRED EMBODIMENTS

The method of the present invention provides RTV silicone sealant compositions which cure to provide sealant with at least one air exposed surface which has a drying oil layer on it. This longevity of the drying oil layer is increased by the presence of particulate zinc oxide in the RTV silicone sealant composition when present in an amount of at least 2 parts by weight per 100 parts by weight of the polymer of the RTV silicone sealant composition. Preferably, the zinc oxide is present in amounts from 2 to 15 parts by weight per 100 parts by weight of polymer, more preferably from 3 to 10 parts by weight per 100 parts by weight of polymer.

The RTV silicone sealant composition comprises those RTV silicone compositions known in the art and for this invention are those where the hydrolysis of the hydrolyzable (condensable) group produces a non-acidic leaving compound and for the purposes of this application are termed "non-acidic" RTV silicone sealant compositions and comprise a polymer having condensable silyl end groups, a moisture sensitive silicon-crosslinker, a filler, drying oil, and optionally a curing catalyst for the composition.

The polymers include polydiorganosiloxanes having condensable end groups and primarily made up of diorganosiloxane units ($R'_2SiO$), but small amounts of other siloxane units may be present, such as monoorganosilsesquioxane units or $SiO_2$ units which provide branching and triorganosiloxy units which provide terminations of the polymer chains. R' is a monovalent hydrocarbon radical or a halogenated monovalent hydrocarbon radical. Examples of monovalent hydrocarbon radicals are alkyl radical such as methyl, ethyl, propyl, and n-octyl,; alkenyl radicals such as vinyl and allyl; aryl radicals such as phenyl or tolyl; cycloalkyl radicals such as cyclohexyl, and aralkyl radicals such as 2-phenylethyl. Examples of halogenated monovalent hydrocarbon radicals are perfluoroalkylethyl radicals such as 3,3,3-trifluoropropyl, and another halogenated radical is gamma-chloropropyl. The polydiorganosiloxanes useful in this invention are those which contain condensable end groups which can be hydroxyl groups, or hydrolyzable groups such as silicon-bonded alkoxy groups, ketoximo groups, amino groups, amido groups, aminoxy groups, and alkenoxy groups. Polydiorganosiloxanes which contain the hydrolyzable groups generally have chain terminating siloxane units of the formula —$Si(X)_y(R')_{(3-y)}$, in which R' is a monovalent hydrocarbon radical or a halogenated hydrocarbon radical, X is a hydrolyzable group, and y is 1, 2, or 3.

The moisture sensitive crosslinker is a silicon compound which contains at least two hydrolyzable groups per molecule, preferably more than two hydrolyzable groups per molecule. The hydrolyzable groups are those where the leaving groups are non-acidic. In those situations in which the polydiorganosiloxane contains more than two hydrolyzable groups per molecule, the crosslinker can have two hydrolyzable groups per molecule. The moisture sensitive crosslinkers can be silanes or partially hydrolyzed products of the silanes. Examples of silicon-bonded hydrolyzable groups on the crosslinkers are alkoxy groups, ketoximo groups, amido groups, amino groups, aminoxy groups, and alkenoxy groups. Examples of alkoxy groups are methoxy, ethoxy, n-propoxy, isopropoxy, and methoxyethoxy. Examples of ketoximo groups are dimethylketoximo, methylethylketoximo, methylpropylketoximo, methylbutylketoximo, and diethylketoximo. Examples of amino groups are N,N- diethylamino, N-ethylamino, N-propylamino, N,N-methylcyclohexylamino, N-butylamino, and N-cyclohexylamino. Examples of akenyloxy groups are propenoxy, isopropenoxy, and butenoxy. Examples of amido groups are N- methylacetamido, N-ethylacetamido, N-butylacetylamido, and N-methylbenzamido. Example of aminoxy groups are N,N-dimethylaminoxy, N,N-methylethylaminoxy, and N,N-diethylaminoxy.

Examples of crosslinkers are methyltrimethoxysilane, methyltriethoxysilane, vinyltrimethoxysilane, methylphenyldiethoxysilane, 3,3,3-trifluoropropyltrimethoxysilane, methyltri(methylethylketoximo)silane, vinyltri(methylethylketoximo)silane, ethyltri(N,N-diethylamino) silane, dimethyldi(N,N-dibutylamino)silane, vinyltri(N-methyl-N-cyclo-hexylamino)silane, methyltri(N-methylacetamido)silane, methylvinyldi(N-methylacetamido)silane, methyltri(isoprenoxy)silane, n-propylorthosilicate, and ethylpolysilicate.

The crosslinker is used in amounts which are conventionally used for making curable silicone elastomeric compositions and which cure at room temperature. The amounts used will vary depending upon the particular crosslinker chosen and the properties of the cured elastomer desired. Preferably the crosslinker is present in amounts of from 0.5 to 15 parts by weight per 100 parts by weight of the polymer.

A mixture of polydiorganosiloxane and crosslinker will usually cure at room temperature when exposed to moisture, however, sometimes this time period is too slow for practical applications and it is desirable to accelerate the cure rate and reduce the time to cure composition. In these situations, a catalyst is used. These catalysts include metal salts of carboxylic acids such as dibutyl tin dilaurate, dibutyl tin diacetate, and tin 2-ethylhexoate; organotitanates such as tetrabutyl titanate, tetra-n-propyl titanate, diisopropoxy-di(ethoxyacetoacetyl)titanate, and bis(acetylacetonyl) diisopropyl titanate.

In order for the RTV silicone compositions to have desirable properties, they need to contain a filler. One or more fillers can be used. The filler can be a reinforcing filler such as fumed silica, precipitated silica, certain finely divided calcium carbonates, carbon black, and siloxane resins such as those comprised of trimethylsiloxy units and $SiO_{4/2}$ units. These reinforcing fillers can have surfaces which are treated or untreated, as is known in the art. The filler can be an extending filler such as calcium carbonate, finely divided quartz, diatomaceous earth (considered a semi-reinforcing filler), iron oxides, and titanium dioxide. Other filler or pigments may be added for the purpose of imparting color to the sealant.

The RTV silicone compositions used in the present method contain a drying oil, which include the natural drying oils, such as tung oil, linseed oil, vernonia oil, and oiticica oil; and modified natural drying oils such as boiled linseed oil and dehydrated castor oil. Tung oil and oiticica oil are preferred because they provide the broadest utility with different kinds of RTV silicone compositions and give the most improved results An effective amount of natural drying oil is from 0.5 to 10 parts by weight per 100 parts by weight of polymer. The preferred amount of natural drying oil is from 0.5 to 4 parts by weight per 100 parts by weight of polymer Other ingredients which are conventionally used in formulating RTV silicone compositions used as sealants and caulking materials can be used in these compositions, as long as, they do not interfere with the drying oil surface layer or its longevity. These ingredients include non-slump agents and additives to provide mildew resistance.

The non-acidic RTV silicone sealant compositions useful in the method of this invention can be prepared by methods known in the art. A number of these non-acidic RTV silicone sealant compositions are described herein. For this invention, drying oil and zinc oxide are added to the known compositions. A preferred method is to combine the polymer with the crosslinking agent and curing catalyst, if used, then filler is added, zinc oxide, and finally the drying oil. The drying oil often has a tendency to separate from the remaining ingredients of the RTV silicone sealant composition during storage and therefore it is preferred to combine it with the rest of the ingredients shortly before it is to be exposed to air atmosphere for curing. When the RTV sealant composition is to be stored, the polymer, crosslinking agent, filler, curing catalyst, and zinc oxide are mixed and stored in one storage container and the drying oil is stored in a second storage container, and then the contents of the two containers are mixed shortly before applying the composition as a sealant or caulking material and exposing it to atmospheric moisture and allowing it to vulcanize. Non-acidic RTV silicone sealant compositions which are available commercially can be used and the zinc oxide can be blended with them followed by the blending in of the drying oil.

After the composition is obtained, it is exposed to moisture, such as atmospheric moisture until a cured sealant with a modified surface is obtained. Different RTV silicone compositions will cure at different rates, however, one can estimate the time to achieve surface cure by checking the surface to see if it is tacky. If lightly touching the surface with a finger, a tackiness is observed the surface has not yet reached the cured state, however, if no tack is observed, the surface is considered cured. It is usually desired to have the surface reach the cured state in a few hours to one day to avoid dust and dirt from blowing onto and adhering to the surface.

Cured silicone elastomeric surfaces are known to have glossy to highly glossy surfaces. Over a period of time the surfaces of the cured composition becomes dull and has a velvet appearance, i.e. a dull surface or finish, also known as a matte finish (mat finish). As the cured surface of the sealant becomes dull, this is the drying oil layer forming on the air exposed surface and oxidation is taking place.

Because the drying oil often separates from the remainder of the RTV silicone sealant composition upon storage and would require mixing before use, it is preferred that at least part of the RTV silicone composition be stored in one package and the drying oil be stored in another package. In step (A), the composition is prepared by mixing (blending) the contents of the packages just prior to exposing the composition to moisture.

One preferred method of this invention mixes the particulate zinc oxide with an RTV silicone sealant composition obtained by mixing a hydroxyl endblocked polydiorganosiloxane, a filler, and as the moisture sensitive crosslinker, a ketoximo-silicon crosslinker having at least three silicon-bonded ketoximo groups per molecule. A ketoximosilicon compound can be a mixture of ketoximosilanes and alkoxyketoximosilanes. One such ketoximosilane mixture comprises methyltri(methylethylketoximo)silane, methyldi(methylethylketoximo)methoxysilane, and methyldimethoxy(methylethylketoximo)silane and another ketoximosilane mixture comprises a mixture of tetraketoximosilane, ethoxytri(methylethylketoximo)silane, diethoxydi(methylethylketoximo)silane, and triethoxy (methylethylketoximo)silane. The latter mixture is known in the art, for example in U.S. Pat. No. 4,657,967, issued to Klosowski et al on Apr. 14, 1987, and in U.S. Pat. No. 4,973,623, issued to Haugsby et al on Nov. 27, 1990, both of which are hereby incorporated by reference to show ketoximosilane mixtures and RTV silicone compositions made using the ketoximosilane mixtures. RTV silicone compositions made from these ketoximosilane mixture preferably contain a catalyst, for example a tin catalyst such as dibutyl tin dilaurate, or a titanate catalyst such as diisopropoxy di(ethoxyacetoacetyl) titanate. To these RTV silicone compositions to which zinc oxide has been added, natural drying oils are also added. The preferred natural drying oil is tung oil. These RTV silicone compositions preferably contain calcium carbonate as the filler.

Another preferred method of this invention mixes particulate zinc oxide with an RTV silicone composition obtained by mixing a hydroxyl endblocked polydiorganosiloxane, an aminoxysilicon crosslinker as the moisture sensitive silicon crosslinker and also contains as part of that crosslinker but acting as a chain extender, a diorganodi(amido)silane, such as methylvinyldi(N-methylacetamido)silane. These kinds of RTV silicone compositions are known from Toporcer et al in U.S. Pat. No. 3,817,909, issued Jun. 18, 1974, and Klosowski in U.S. Pat. No. 3,996,184, issued Dec. 7, 1976, both of these patents are incorporated by reference to show the combination of aminoxysilicon crosslinkers and amidosilane chain extenders. The chain extender can be used to make low modulus sealants useful in the building construction industry. These compositions can be prepared without the use of a catalyst. Calcium carbonate is a useful filler for such compositions. The preferred compositions are those to which zinc oxide and drying oil has been added. Tung oil is the preferred drying oil.

Another method of this invention comprises using a two package composition in which a first package comprises a hydroxyl endblocked polydiorganosiloxane, a filler, and may contain the drying oil, and a second package comprises the moisture sensitive silicon-crosslinker. The second package can also contain filler and a curing catalyst for the RTV silicone composition. If the drying oil is not present in the first package, it may be contained in a third package. The particulate zinc oxide can be added to either package. One kind of RTV silicone composition of this kind, is where the moisture sensitive silicon- crosslinker is an alkoxysilicon crosslinker, such as n-propyl ortho silicate or ethylpolysilicate and a tin catalyst is used. Such compositions are well known in the art. Preferably, the natural drying oil is tung oil. These compositions are stored in separate packages to prevent premature curing which can occur if all the ingredients are mixed for too long a time period before the use of the composition.

One method which uses as the moisture sensitive crosslinker, an alkoxysilicon compound, can contain all the ingredients in one package. Storage stable compositions can be obtained when a titanate catalyst is used as the curing catalyst, the ratio of the alkoxysilicon crosslinker to the endgroups of the polydiorganosiloxane are such that there is at least one alkoxysilicon crosslinker molecule per polydiorganosiloxane endgroup. These one package RTV silicone compositions which comprise the alkoxysilicon crosslinker are described in U.S. Pat. No. 3,161,614, issued Dec. 15, 1964 to Hyde et al, U.S. Pat. No. 3,175,993, issued Mar. 30, 1965, to Weyenberg, U.S. Pat. No. 3,334,067, issued Aug. 1, 1967, and U.S. Pat. No. 4,871,827, issued Oct. 3, 1989, to Klosowski et al where these patents are hereby incorporated by reference to show the formulations useful for preparing one package RTV silicone composition in which the moisture sensitive crosslinker is an alkoxysilicon compound. In these methods, the natural drying oils are preferably stored in a separate container or storage compartment from the remainder of the one package RTV silicone composition which would contain the zinc oxide and the drying oil is mixed with the RTV silicone composition shortly before it is intended to be used. The preferred natural drying oil is tung oil.

A preferred RTV silicone composition is one which contains a siloxaphobic agent in addition to the drying oil, such as described by Altes et al in U.S. Pat. No. 5,357,025. The siloxaphobic agent is a material providing a siloxaphobic surface layer to the cured composition. This siloxaphobic agent can be a fluorocarbon alcohol, a reaction product of a fluorocarbon alcohol and a hydrolyzable silane, or a mixture of the fluorocarbon alcohol and the reaction product of the fluorocarbon alcohol and the hydrolyzable silane. The fluorocarbon alcohol contains at least one fluorocarbon group of the formula $C_xF_{(2x+1)}$—group where x has an average value of at least 6. Fluorocarbon alcohols which have fluorocarbon groups where x was less than 6 did not prevent the migration of siloxane species to the surface of the sealant. Preferably, the fluorocarbon alcohols are those with fluorocarbon groups in which x has an average value of from 6 to 20. The fluorocarbon alcohols are commercially available and are illustrated by the following formulae

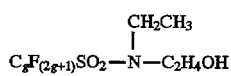

where g has a value of from 6 to 20. Commercial mixtures are sold in which g has an average of 7 and contain species in which g ranges from 6 to 10 inclusive. Such a mixture is FC-10 which is sold by Minnesota Mining and Manufacturing Company (3M), Minneapolis, Minn. Other commercial mixtures sold by 3M are FC-170C which is a fluorocarbon alcohol and has the following average formula

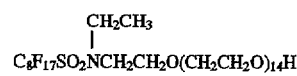

and FC-171 which is a fluorocarbon alcohol and has the following average formula

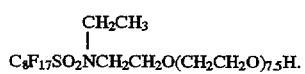

Other commercially available fluorocarbon alcohols include $C_8F_{17}CH_2CH_2OH$, and $C_xF_{(2x+1)}CH_2CH_2O(CH_2CH_2O)_fH$ where x is from 6 to 16 and f is a positive integer. The siloxaphobic agent is preferably a reaction product of a fluorocarbon alcohol and a hydrolyzable silane. These siloxaphobic agents are siloxaphobic reaction product mixtures which are made by mixing at least 0.01 mole of the fluorocarbon alcohol with one mole of the hydrolyzable silane under conditions which exclude moisture from contacting the ingredients, preferably 0.1 mole of fluorocarbon alcohol per one mole of hydrolyzable silane. Fluorocarbon alcohols can be used by themselves but some are solid at room temperature and handling and mixing with the other ingredients is not fully acceptable. The fluorocarbon alcohols are described above and the hydrolyzable silanes are those defined above as the crosslinking agent. The resulting mixture is heated until some of the fluorocarbon alcohol reacts with the hydrolyzable silane and forms a C—O—Si bond. The resulting reaction mixture is unreacted hydrolyzable silane, unreacted fluorocarbon alcohol, and a reaction product of fluorocarbon alcohol and the hydrolyzable silane in which at least one Y group is replaced by the fluorocarbon alcohol, as illustrated by the following equation

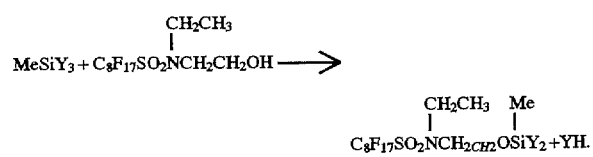

The siloxaphobic reaction product mixtures contain from >0% to 100% reaction product of fluorocarbon alcohol and silane. These reaction product mixtures provide the preferred siloxaphobic agents, especially when the reaction product of the fluorocarbon alcohol and silane is <50% of the siloxaphobic reaction mixture. A preferred siloxaphobic reaction mixture is one in which the fluorocarbon alcohol has the following formula

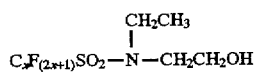

wherein x has an average value of at least 6, the hydrolyzable silane has the formula

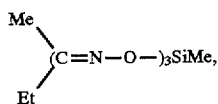

and the reaction product of the fluorocarbon alcohol and the hydrolyzable silane comprises a compound of the formula

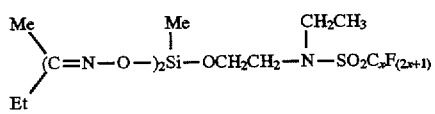

wherein x has an average value of at least 6. The siloxaphobic reaction mixture is preferred because the siloxaphobic surface layer is rapidly formed during the curing of the elastomeric polyorganosiloxane composition and the surface resists the accumulation of dirt and/or stain when the sealant is very vulnerable to dirt pick-up. The siloxaphobic reaction mixture through some unknown mechanism more readily forms the siloxaphobic surface layer than the use of unreacted fluorocarbon alcohol, i.e. the fluorocarbon alcohol is merely mixed with the other elastomeric polydimethylsiloxane composition ingredients. The siloxaphobic surface layer is regenerated over the useful life of the sealant. The siloxaphobic reaction mixture acts as a reservoir and continually renews the siloxaphobic surface layer as it becomes depleted with age. The siloxaphobic surface layer also provides a sealant which exhibits retardation of color formation of the sealant surface and the surrounding areas adjacent to the sealant which may be the result of exposure to weather. The siloxaphobic surface layer keeps the properties of the sealant from changing with age because siloxane ingredients are not readily lost by migration or evaporation, but are maintained within the sealant matrix. The siloxaphobic reaction mixture does not adversely effect the curing properties of the elastomeric polydimethylsiloxane composition, and the adhesion to various substrates, particularly those used in building construction. The siloxaphobic reaction mixture can be used in small amounts and yet provide its useful properties over long periods of time. The amounts are such that the fluorocarbon group is present in the composition in amounts of from 0.1 to 7 inclusive weight percent based on the weight of the composition, preferably from 1 to 3 weight percent.

The following examples are presented for illustrative purposes and should not be construed as limiting the present invention which is properly delineated in the claims. In the examples, part or parts is by weight and viscosities were measured at 25° C.

EXAMPLE

An RTV silicone composition was prepared by mixing under conditions which protected it against the ingress of moisture. In a mixer, 100 parts of a silanol endblocked polydimethylsiloxane having a viscosity of about 50 Pa.s, and 1 part of a ketoximosilane mixture of approximately 72 weight percent methyltri(methylethylketoximo)silane, 21 weight percent methyldi(methylethylketoximo) methoxysilane, 0.5 weight percent methyldimethoxy (methylethylketoximo)silane, and 6.5 weight percent impurities were mixed for one minutes under 74.29 kPa of vacuum, and then was allowed to stand for 30 minutes. Then, 1 part of methylvinyl- di(N-methylacetamido)silane was added and stirred for one minute under 74.29 kPa of vacuum. To the resulting mixture, 12 parts of a mixture of 2.5 parts of the above ketoximosilane mixture, 2.4 parts of a fluorocarbon alcohol (FC-10), 0.4 part of beta-aminoethyl-gamma-amino- propyltrimethoxysilane, 0.4 part of gamma-glycidoxypropyltimethoxy- silane, 0.07 part of dibutyl tin dilaurate 4 parts of methyltrimethoxy- silane, 1 part of diisopropoxy di(ethoxyacetoacetyl) titanate, 1.1 parts of the reaction product of the FC-10 fluorocarbon alcohol and the ketoximosilane mixture has an average formula

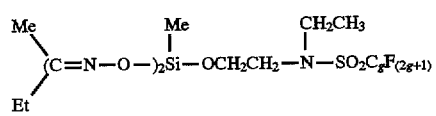

wherein g has an average value of 7, and 0.6 part impurities was added and stirred for one minute under 74.29 kPa vacuum. The FC-10 was sold by Minnesota Mining and Manufacturing Company (3M), Minneapolis, Minn., and was a mixture of species from the formula

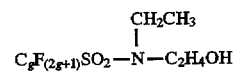

in which g has a value of from 6 to 10. Next, 60 pads of stearic acid treated precipitated calcium carbonate filler having an average particle diameter of about 0.04 micrometer and 1 part of a polymer of 2,5- furandione with 1,3-butadiene were added and stirred for 5 minutes under 74.29 kPa of vacuum. The resulting mixture was identified as a base composition and six such base mixtures were prepared. One of the base compositions was considered a control formulation and 1.75 part of tung oil was added and stirred under 74.29 kPa of vacuum. To five other base compositions, 2, 4, 6, 8, and 10 parts of particulate zinc oxide having an average particle diameter of 0.12 micrometers was added to each respectively, and each was then stirred for 5 minutes under 74.29 kPa of vacuum. To each such composition prepared, 1.75 parts of tung oil was added and stirred one minute under 74.29 kPa of vacuum. Each resulting formulation was then packaged in Semco™ tubes, made by Courtlands Aerospace, California, and centrifuged to eliminate any entrained air. Samples of each of the 6 formulations were cast as 5.08 by 5.08 cm slabs of 0.254 cm thickness on polyethylene sheets and allowed to cure for 14 days at 21° C. and 50% relative humidity. After 14 days cure, each of the test panels had developed a matte finish which was indicative of a tung oil modified sealant surface. Test panels containing the 6 formulations were placed in a QUV accelerated weathering chamber using a QUV A 340 light source with a cycle of 8 hours ultraviolet radiation exposure at 70° C. followed by 4 hours of condensing humidity at 50° C. These evaluations were done in accordance with ASTM D 4587-86. The QUV™ Tester was from Q-Panel Corp., Cleveland, Ohio.

After 650 hours in the QUV Tester, inspection of the surface of the control formulation showed that the tung oil surface was deteriorating as the matte finish was disappearing whereas the surfaces of those formulation containing the zinc oxide showed no signs of loss of surface tung oil layer so indicated because the matte finish was still equivalent to the matte finish initially observed. These results illustrated that zinc oxide in an RTV silicone formulation increased the longevity of the the drying oil on its surface.

Six RTV silicone compositions were prepared as described above, except the combined amount of calcium carbonate filler and zinc oxide was kept constant at 60 parts per 100 parts of polydimethylsiloxane, e.g. the control composition =60 parts calcium carbonate, the composition containing 2 parts zinc oxide had 58 parts of calcium carbonate, the composition containing 4 parts zinc oxide had 56 parts of calcium carbonate, and the like. The combined parts of zinc oxide and calcium carbonate were kept constant to avoid any potential variations of the physical properties due to change of the pigment to binder ratio. Each of these formulations were tested for durometer using the Shore A scale by ASTM D 2240, and testing according to ASTM D 412, the tensile strength at break and reported in kPa (kilopascals), the elongation at break reported in percent, and 100% modulus reported in kPa. The results of these test were as reported in the Table.

TABLE

| PROPERTY | AMOUNT OF ZINC OXIDE IN FORMULATION, in parts | | | | | |
| --- | --- | --- | --- | --- | --- | --- |
|  | 0 | 2 | 4 | 6 | 8 | 10 |
| DUROMETER | 19 | 20 | 18 | 20 | 19 | 19 |
| TENSILE AT BREAK, kPa | 1880 | 1820 | 1660 | 2030 | 1770 | 2010 |

TABLE-continued

| PROPERTY | AMOUNT OF ZINC OXIDE IN FORMULATION, in parts | | | | | |
| --- | --- | --- | --- | --- | --- | --- |
|  | 0 | 2 | 4 | 6 | 8 | 10 |
| ELONGATION, % | 1004 | 1087 | 1045 | 1192 | 1069 | 1169 |
| 100% MODULUS, kPa | 260 | 230 | 230 | 230 | 230 | 230 |

The cured physical properties were not functionally effected by the presence of the zinc oxide.

That which is claimed is:

1. A method of increasing the longevity of a drying oil layer on an air exposed surface of a cured silicone sealant comprising
    (A) mixing particulate zinc oxide into a non-acidic room temperature curable silicone sealant composition comprising a drying oil, a polymer with moisture condensable silyl ends, a crosslinking agent, and a filler where the zinc oxide is added in an amount of at least 2 parts by weight per 100 parts by weight of the polymer,
    (B) exposing the resulting mixture of (A) to atmospheric moisture producing a cured sealant having a drying oil layer on an air exposed surface where said surface maintains the drying oil layer on it for a longer period of time than if zinc oxide was not added.

2. The method in accordance with claim 1 in which the drying oil is tung oil.

3. The method in accordance with claim 1 in which the room temperature curable silicone sealant composition also comprises a fluorinated compound.

4. The method in accordance with claim 2 in which the room temperature curable silicone sealant composition also comprises a fluorinated compound.

5. The method in accordance with claim 3 in which the fluorinated compound is a fluorinated alcohol having at least 13 fluorine atoms per molecule.

6. The method in accordance with claim 4 in which the fluorinated compound is a fluorinated alcohol having at least 13 fluorine atoms per molecule.

7. The method in accordance with claim 1 further comprising storing the non-acidic room temperature vulcanizable silicone composition in a first package and the drying oil in a second package prior to step (B).

8. The method in accordance with claim 7 in which the drying oil is tung oil.

9. The method in accordance with claim 1 in which the silicon-crosslinker is a ketoximosilicon crosslinker having at least three silicon-bonded ketoximo groups per molecule.

10. The method in accordance with claim 9 in which the room temperature vulcanizable silicone composition further comprises a curing catalyst.

11. The method in accordance with claim 10 in which the curing catalyst is a titanate catalyst.

12. The method in accordance with claim 10 in which the curing catalyst is a tin catalyst.

13. A cured silicone sealant obtained from the method of claim 1 having an air exposed drying oil surface layer which is maintained for long periods of time when the air exposure includes exposure to ultraviolet radiation.

14. A cured silicone sealant obtained from the method of claim 2 having an air exposed drying oil surface layer which is maintained for long periods of time when the air exposure includes exposure to ultraviolet radiation.

15. A cured silicone sealant obtained from the method of claim 3 having an air exposed drying oil surface layer which is maintained for long periods of time when the air exposure includes exposure to ultraviolet radiation.

16. A cured silicone sealant obtained from the method of claim 4 having an air exposed drying oil surface layer which is maintained for long periods of time when the air exposure includes exposure to ultraviolet radiation.

17. A cured silicone sealant obtained from the method of claim 5 having an air exposed drying oil surface layer which is maintained for long periods of time when the air exposure includes exposure to ultraviolet radiation.

18. A cured silicone sealant obtained from the method of claim 6 having an air exposed drying oil surface layer which is maintained for long periods of time when the air exposure includes exposure to ultraviolet radiation.

19. A room temperature curable silicone sealant composition comprising a polymer with moisture condensable silyl ends, a crosslinking agent, a filler, a drying oil, and at least 2 parts by weight of particulate zinc oxide per 100 parts by weight of the polymer.

20. The composition according to claim 19 in which the drying oil is tung oil.

21. The composition according to claim 19 in which the room temperature curable silicone sealant composition also comprises a fluorinated compound.

22. The composition according to claim 20 in which the room temperature curable silicone sealant composition also comprises a fluorinated compound.

23. The composition according to claim 21 in which the fluorinated compound is a fluorinated alcohol containing more than 13 fluorine atoms per molecule.

24. The composition according to claim 23 in which the drying oil is tung oil.

* * * * *